US012112404B1

(12) United States Patent
Looper (10) Patent No.: US 12,112,404 B1
(45) Date of Patent: Oct. 8, 2024

(54) SYSTEMS AND METHODS FOR GENERATING CUSTOMIZED ENHANCED REALITY EXPERIENCES BASED ON MULTI-ANGLE FIDUCIAL MARKERS

(71) Applicant: Illuscio, Inc., Culver City, CA (US)

(72) Inventor: Sean Looper, Flagstaff, AZ (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/760,307

(22) Filed: Jul. 1, 2024

(51) Int. Cl.
*G06T 11/00* (2006.01)
*G06K 7/14* (2006.01)
*G06T 3/60* (2006.01)

(52) U.S. Cl.
CPC ............ *G06T 11/00* (2013.01); *G06K 7/1417* (2013.01); *G06T 3/60* (2013.01)

(58) Field of Classification Search
None
See application file for complete search history.

(56) References Cited

U.S. PATENT DOCUMENTS 11,138,807 B1* 10/2021 Inha ..................... G06T 15/506
2020/0364482 A1* 11/2020 Bradski ................ G06K 7/1443

* cited by examiner

*Primary Examiner* — Robert J Craddock
(74) *Attorney, Agent, or Firm* — Ansari Katiraei LLP; Arman Katiraei; Sadiq Ansari (57) ABSTRACT

Multi-angle fiducial markers with different sets of encoded cells are used for the generation of customized enhanced reality experiences on user devices. A device detects a multi-angle fiducial marker from its current position. The device decodes first data from a particular set of cells of the multi-angle fiducial marker that are resolvable from the current position of the device relative to the multi-angle fiducial marker position and one or more cells from the other sets of cells being unresolvable at the device current position. The device retrieves a first presentation of content from a source identified in the first data, defines a second presentation for the content based on the first data, and generates an enhanced reality experience with the second presentation of the content presented at a specific position relative to the position of the multi-angle fiducial maker in a display of the device.

20 Claims, 7 Drawing Sheets

SYSTEMS AND METHODS FOR GENERATING CUSTOMIZED ENHANCED REALITY EXPERIENCES BASED ON MULTI-ANGLE FIDUCIAL MARKERS

BACKGROUND

Movies and science fiction envision a future in which virtual, augmented, mixed, and/or other enhanced reality experiences provide engaging, interactive, promotional, informational, assistive, and/or other dynamic content wherever we may be. These kinds of enhanced reality experiences have yet to materialize as enhanced reality experiences mostly remain confined to controlled or static environments such as one's home or work space and to content that the user selects for the enhanced reality experience.

Many of the technical limitations preventing the wider spread adoption of spatial streaming and enhanced reality have been overcome. For instance, portable devices have become more powerful and network performance has improved to the point that the enhanced reality experience content may be accessed anywhere at any time. However, issues related to generating the different enhanced reality experiences quickly and seamlessly in real-time in a manner that is not jarring, overwhelming, or disruptive remain.

DETAILED DESCRIPTION OF PREFERRED EMBODIMENTS

The following detailed description refers to the accompanying drawings. The same reference numbers in different drawings may identify the same or similar elements.

Disclosed are systems and associated methods for generating customized enhanced reality experiences based on multi-angle fiducial markers. The multi-angle fiducial markers simplify the creation of virtual, augmented, mixed, and/or other enhanced reality experiences with dynamic content that changes or moves in response to a changing user field-of-view and/or position in a dynamic environment. The systems and methods use the multi-angle fiducial markers as different anchor points for presenting different content with a correct rotation, orientation, and position relative to the user in real-time so that the enhanced reality experience appears in a manner that is not jarring, overwhelming, or disruptive to the user. The systems and methods also use the multi-angle fiducial markers to move or adjust the enhanced reality experience relative to the movements and positioning of the user. This creates a more engaging, seamless, and passive enhanced reality experience relative to other experiences that present content front and center or that present digital characters that are orientated or looking away from the user in an unnatural manner.

Figure 1:
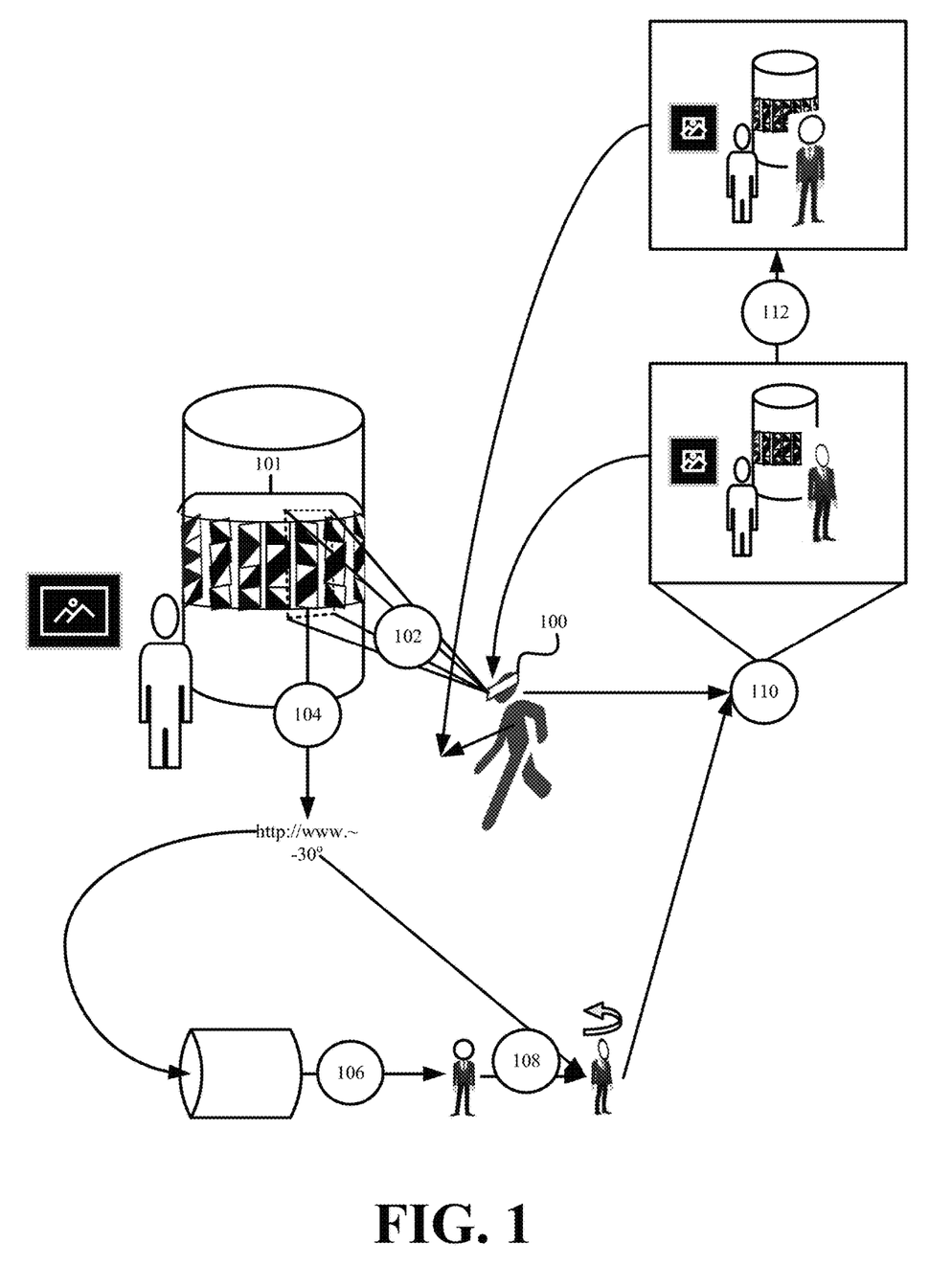
FIG. 1 illustrates an example of generating a customized enhanced reality experience based on a multi-angle fiducial marker in accordance with some embodiments presented herein.

FIG. 1 illustrates an example of generating a customized enhanced reality experience based on a multi-angle fiducial marker in accordance with some embodiments presented herein. A user may be walking in a dynamic environment (e.g., a street, mall, building, or other environment with different storefronts, signage, or interactive elements). The user may wear or bring with them device 100. Device 100 may include a headset, enhanced glasses, wearable device, smart phone, or other portable device with a camera, display, and hardware resources for scanning the multi-angle fiducial markers and presenting the different enhanced reality experiences associated with each multi-angle fiducial marker.

Device 100 detects (at 102) multi-angle fiducial marker 101 from a distance and at an angle. In other words, multi-angle fiducial marker 101 is not positioned directly in front of device 100 but rather in a periphery of a field-of-view captured by a camera of device 100.

In some embodiments, multi-angle fiducial marker 101 is a physical two-dimensional (2D) object such as a sticker, poster, paper, or other graphic that is presented on a flattened or curved surface. In some other embodiments, multi-angle fiducial marker 101 is a representation with a physical or digital 3D form. For instance, multi-angle fiducial marker 101 may be presented as a sphere on a display.

Multi-angle fiducial marker 101 is encoded with at least one value and different transform data that is resolvable from different angles. For instance, multi-angle fiducial marker 101 redundantly encodes the same value with different transform data in different sets of cells. Each set of cells may be printed on a 2D surface with or without visual effects (e.g., gradients, offset angles, etc.) such that each set of cells are machine readable or resolvable from a unique angle or set of angles associated with that set of cells and not machine readable, unresolvable, or partially occluded from other angles.

Device 100 decodes (at 104) a value and transform data from the specific set of cells of multi-angle fiducial marker 101 that are resolvable from the current user position. The value may be a string that corresponds to a Uniform Resource Locator (URL) where spatial streaming content or content for an enhanced reality experience is accessible. Alternatively, the value may correspond to a unique identifier that is associated with a fixed URL or network destination at which different enhanced reality experiences associated with different unique identifiers are accessible. The transform data may specify the angle or offset position at which device 100 detects (at 102) multi-angle fiducial marker 101 or the angle or offset position for the resolved set of cells about multi-angle fiducial marker 101.

Device 100 retrieves (at 106) the content associated with the enhanced reality experience from a destination that is accessed or identified by the value decoded (at 104) from multi-angle fiducial marker 101. The retrieved (at 106)

content may include an animated character, video, animation, scene, game, environment, or model that may be interacted with or presented as part of the enhanced reality experience. The retrieved (at 106) content may be defined with points of a point cloud or with meshes and/or polygons of other 3D formats.

Device 100 adjusts (at 108) a presentation of the retrieved (at 106) content according to the associated transform data that is decoded (at 104) from multi-angle fiducial marker 101. Adjusting (at 108) the presentation may include rotating, orientating, or otherwise adjusting the positioning of the content by an angle or other offset amount determined from the transform data, and/or positioning the content relative to the position of multi-angle fiducial marker 101 in a field-of-view or display of device 100. For instance, the transform data may specify positioning the content five feet in front of multi-angle fiducial marker 101, two feet off of a ground surface, and shifted 45-degrees to the right to face the user or be directed to the offset position of the user.

Device 100 generates (at 110) the enhanced reality experience with the adjusted (at 108) presentation of the retrieved (at 106) content. Generating (at 110) the enhanced reality experience may include rendering the retrieved (at 106) content at a position relative to multi-angle fiducial marker 101 and with an orientation, rotation, and/or direction that is derived from the decoded (at 104) transform data and/or that corresponds to an angle at which device 100 detected (at 102) multi-angle fiducial marker 101. Device 100 may present the retrieved (at 106) content with physical objects in the user's field-of-view by overlaying the rendered content in a pass-through display or by capturing images of the physical objects and inserting the rendered content into the images according to the adjusted (at 108) presentation.

Device 100 updates (at 112) the enhanced reality experience by changing the positioning and/or orientation of the retrieved (at 106) content as the position of device 100 relative to multi-angle fiducial marker 101 changes. For instance, device 100 may scan and decode different transform data from multi-angle fiducial marker 101 as the position of device 100 relative to multi-angle fiducial marker 101 changes, and may adjust the presentation of the retrieved (at 106) content based on the different transform data. In some embodiments, device 100 may use one or more on-device sensors (e.g., accelerometer, gyroscope, compass, inertial sensor, etc.) to track positional deviations of device 100 since decoding (at 104) the transform data from multi-angle fiducial marker 101, and may adjust the presentation of the retrieved (at 106) content based on the tracked positional deviations.

Figure 2:
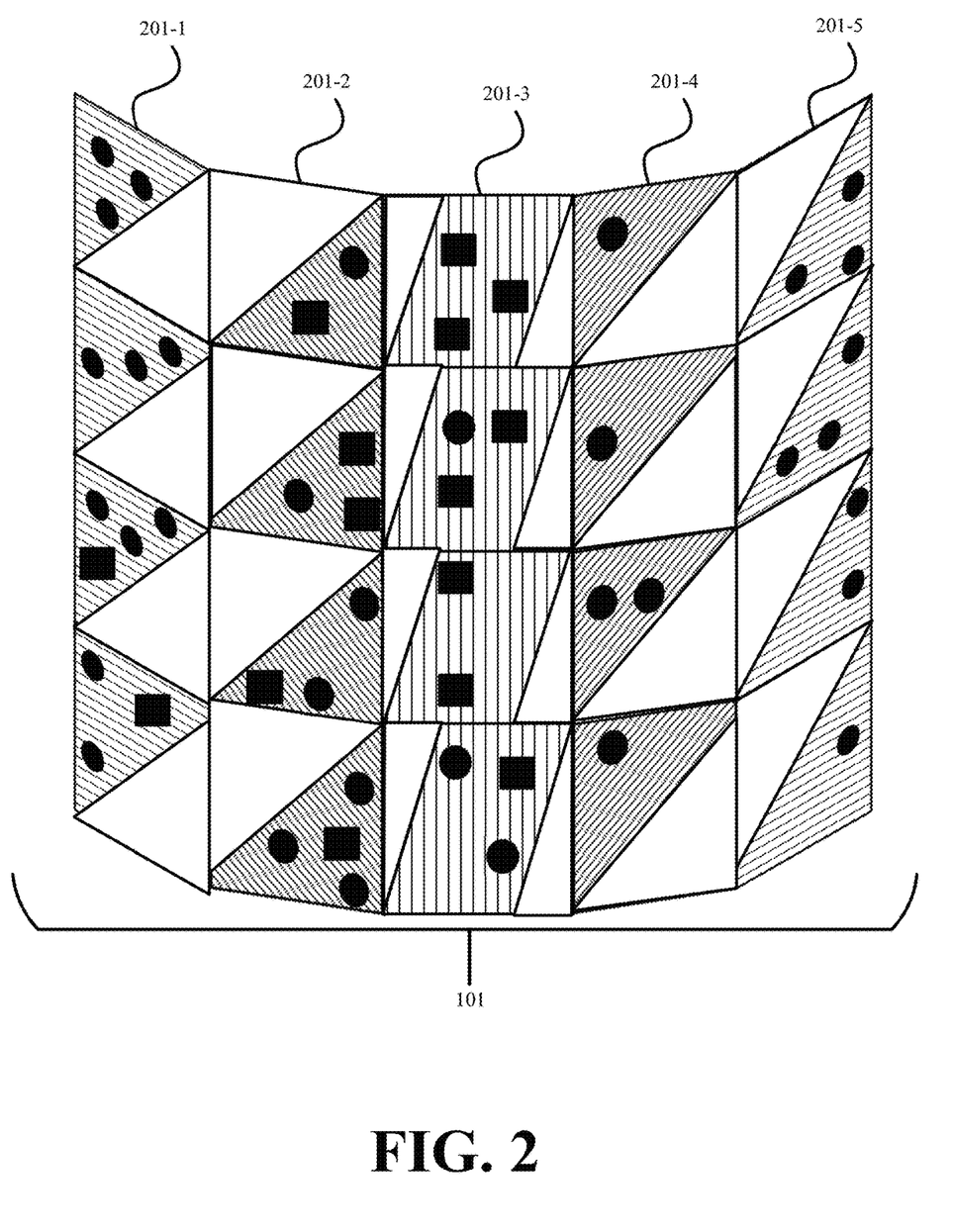
FIG. 2 illustrates an example of a multi-angle fiducial marker in accordance with some embodiments presented herein.

FIG. 2 illustrates an example of multi-angle fiducial marker 101 in accordance with some embodiments presented herein. Multi-angle fiducial marker 101 may be a sticker or graphic that is attached to a flat surface or a curved surface and that has different encoded data that is machine-readable from different angles.

To store the different encoded data, multi-angle fiducial marker 101 includes sets of cells 201-1, 201-2, 201-3, 201-4, and 201-5 (hereinafter collectively referred to as "sets of cells 201" or individually as "set of cells 201") that are printed at offset angles and/or with optical shifts. The offset angles and/or optical shifting cause each set of cells 201 to become readable or resolvable from a different angle or unique range of angles. Sets of cells 201 viewed or captured off-angle will appear partially occluded or the shapes and patterns within each cell will appear distorted, black, or white rather than as a recognized or differentiable pattern for encoded data. For instance, multi-angle fiducial marker 101 may include sets of cells 201 with symbols or patterns that are differentiable across different non-overlapping 30-degree angles. In particular, first set of neighboring cells 201-1 may encode first data and may be read using a device camera or scanner when the device is positioned 0-30 degrees relative to multi-angle fiducial marker 101, and second set of neighboring cells 201-2 may encode second data and may be read using the device camera or scanner when the device is positioned 31-60 degrees relative to multi-angle fiducial marker 101.

In some embodiments, the data associated with each set of cells 201 is encoded using different combinations of anamorphic shapes or patterns within each cell of that set of cells 201. Each shape or pattern within a cell may encode one or more alphanumeric values such that the set of cells 201 encodes a string of values. In some embodiments, the shapes or patterns of each cell may occupy less than all of the cell region to create the optical illusion in which the cell appears completely filled or completed empty when viewed at off-angles and the actual shape or pattern appears when the cell is viewed at the specified angles. In some other embodiments, the shapes or patterns of each cell may occupy the entirety of the cell and still create the optical illusion in which the shapes or patterns blend together at off-angles to make the cell appears as a solid color or pattern and that remain distinct when the cell is viewed at the specified angles. In other words, the shapes or patterns encoding data within each cell are selected to be resolvable by the device camera or scanner at the corresponding angle offset from small or large distances (e.g., 20 feet away). The size of multi-angle fiducial marker 101 and the associated cells may be enlarged to make the cells readable from greater distances.

The data associated with each set of cells 201 may be demarcated by specialized start and end markers similar to start and end markers used for Quick Response (QR) codes. For instance, a first specialized shape or pattern may indicate the topmost, leftmost, or top left cell for the start of a particular set of cells, and a second specialized shape may indicate the bottommost, rightmost, or bottom right cell for the end of the particular set of cells. Accordingly, a device that scans the particular set of cells upside down or with a tilt may correct the orientation of the particular set of set of cells according to the start and end markers, and then decode the data from the correct orientation.

In some embodiments, the data encoded within a set of cells may correspond to a URL, link, or identifier from which specific content may be accessed. To minimize the amount of data that is encoded to each set of cells, the encoded identifier may correspond to a unique alphanumeric value. The alphanumeric value may be associated with a fixed domain and may be used to select different content that is accessible at the fixed domain. For instance, the unique alphanumeric value may be 4 alphanumeric characters which allows for 1,679,616 (e.g., 36×36×36×36) different content to be accessed from the fixed domain.

The same URL, link, or identifier may be encoded with different transform data to each set of cells multi-angle fiducial marker 101 when the same content is to be presented with different presentations or orientation. Alternatively, different URLs, links, or identifiers may be encoded to each set of cells when the accessed content changes as the scanning device moves past multi-angle fiducial marker 101 and reads multi-angle fiducial marker 101 from different angles or offset positions.

The transform data specifies the angle or position of the device relative to multi-angle fiducial marker 101. In some embodiments, the offset value is an increasing scalar value to represent each of the offset angles or positions (e.g., 1, 2, 3, etc.). In some other embodiments, the offset value is a specific angle (e.g., 45 degrees).

Figure 3:
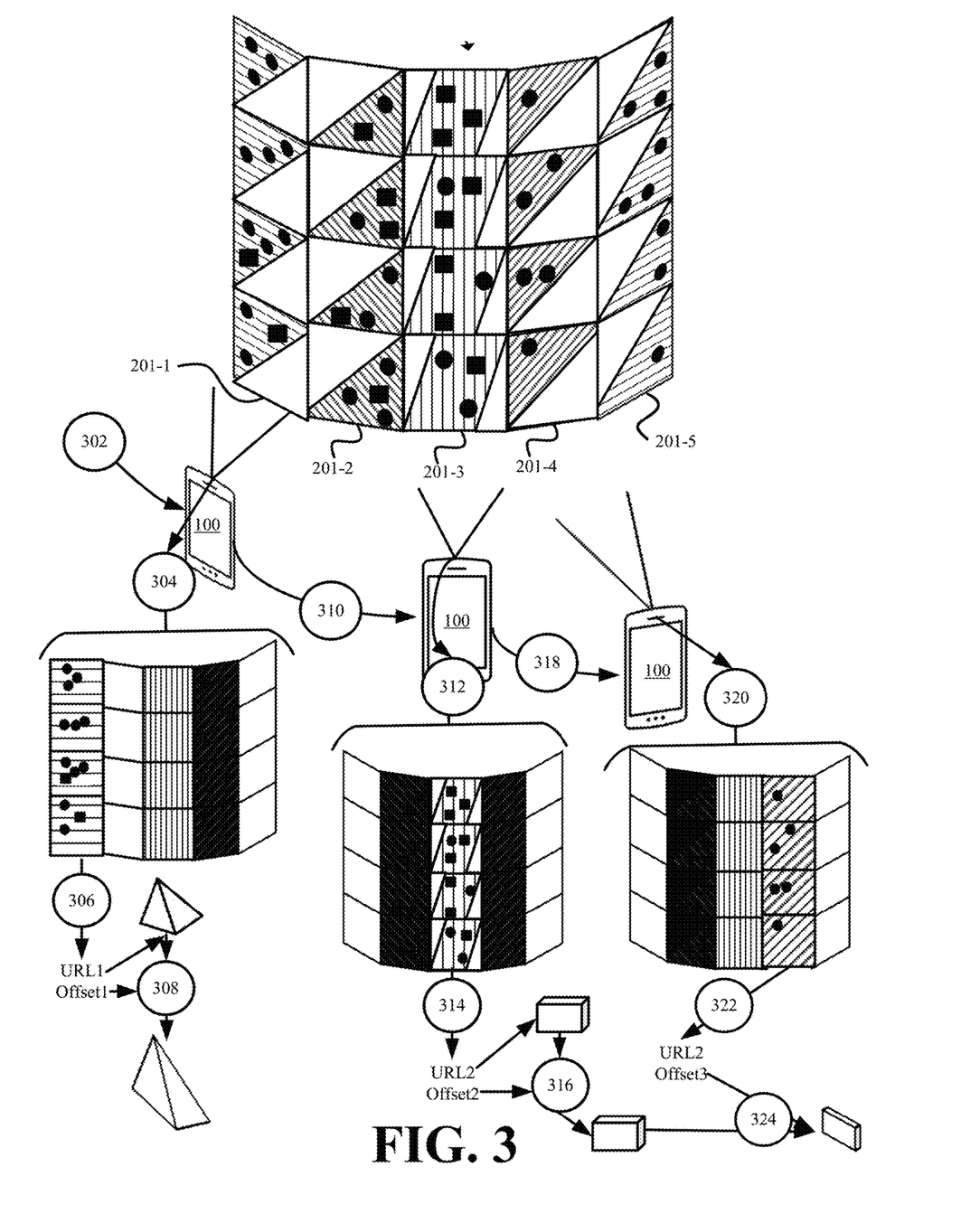
FIG. 3 illustrates an example of scanning a multi-angle fiducial marker from different angles in accordance with some embodiments presented herein.

FIG. 3 illustrates an example of scanning multi-angle fiducial marker 101 from different angles in accordance with some embodiments presented herein. When device 100 is moved (at 302) to a first position relative to multi-angle fiducial marker 101, a camera or scanner of device 100 reads or resolves (at 304) first set of cells 201-1 from multi-angle fiducial marker 101. The other sets of cells (e.g., 201-2, 201-3, 201-4, and 201-5) appear as fully black or white squares due to the optical illusions created through the offset angled or patterned printing of the cells. Device 100 decodes (at 306) a first URL and a first offset value from first set of cells 201-1, accesses first content from the first URL, and presents (at 308) the first content with a first transformation (e.g., rotation) based on the first offset value that causes the first content to appear to be facing or orientated towards device 100.

Device 100 continues moving past multi-angle fiducial marker 101. Specifically, device 100 moves (at 310) form the first position to a second position relative to multi-angle fiducial marker 101. From the second position, the camera or scanner of device 100 reads or resolves (at 312) third set of cells 201-3 from multi-angle fiducial marker 101. The other sets of cells (e.g., 201-1, 201-2, 201-4, and 201-5), including the previously resolved first set of cells 201-1, appear as fully black or white cells. Device 100 decodes (at 314) a second URL and a second offset value from third set of cells 201-3, accesses second content from the second URL, and presents (at 316) the second content with a transformation based on the second offset value.

Device 100 moves (at 318) to a third position at which the camera or scanner of device 100 reads or resolves (at 320) fourth set of cells 201-4 from multi-angle fiducial marker 101. Device 100 decodes (at 322) the same second URL and a third offset value from fourth set of cells 201-4, and adjusts (at 324) the presentation of the second content with a transformation based on the third offset value.

Accordingly, different content or different presentations of the same content may be presented in response to scanning the same multi-angle fiducial marker from different perspectives or positions. The different scans from the different perspectives cause different sets of cells encoding different data in the multi-angle fiducial marker to be resolved with the different data being associated with the retrieval of different content and/or presenting the different content with different views or adjustments. Consequently, the same multi-angle fiducial marker scanned by two different devices at different positions may result in each device presenting the same content or different content with an orientation or direction that is adjusted to the position of that device. In other words, the content is not oriented and presented in the same direction for all users, but adjusted for each user based on the user device's position relative to the multi-angle fiducial marker.

In some embodiments, multi-angle fiducial marker 101 may printed on a 3D surface or presented as a 3D object. For instance, the multi-angle fiducial marker 101 may be printed on a sphere with different sets of cells along different lengths of of the sphere becoming visible and readable as device 100 moves past that sphere. In some other embodiments, a 2D multi-angle fiducial marker 101 may be wrapped around a curved surface to provide additional dimensionality for differentiating between the different sets of cells.

Multi-angle fiducial markers 101 provide a universal and simplistic graphical element with which devices 100 may automatically activate and/or access customized enhanced reality experiences from different content providers at different locations. The user no longer has to manually select and activate each enhanced reality experience separately via different applications, different manually entered websites, or other user input. Device 100 is configured to passively scan for multi-angle fiducial markers 101, and to present the customized content in response to reading or resolving a multi-angle fiducial marker 101. For instance, device 100 may be a headset, augment reality glasses, or another device with a camera that the user carries with them and that is continuously scanning the user's field-of-view for multi-angle fiducial markers 101.

Moreover, device 100 by referencing multi-angle fiducial markers 101 creates the customized enhanced reality experiences in an unintrusive manner. Some other virtual reality, mixed reality, and/or augmented reality devices present content front and center or directly in the user's field-of-view. Multi-angle fiducial markers 101 are used as anchor points or positional references that cause the enhanced reality experiences to be presented at positions in the user's field-of-view corresponding to where multi-angle fiducial markers 101 are found or scanned. This also causes the presented enhanced reality experiences to be relevant to neighboring storefronts, visual information, and/or other physical objects that are adjacent to the multi-angle fiducial marker 101. For instance, the multi-angle fiducial marker 101 may be placed next to a storefront in order to present new product information, sales, or entertaining content that may incentivize the user to enter the storefront. Similarly, the multi-angle fiducial marker 101 may be placed next to a transportation map in order to present interactive content for the user to more quickly determine how to navigate to their destination in an unintrusive manner that cannot be seen or heard by other nearby users.

Figure 4:
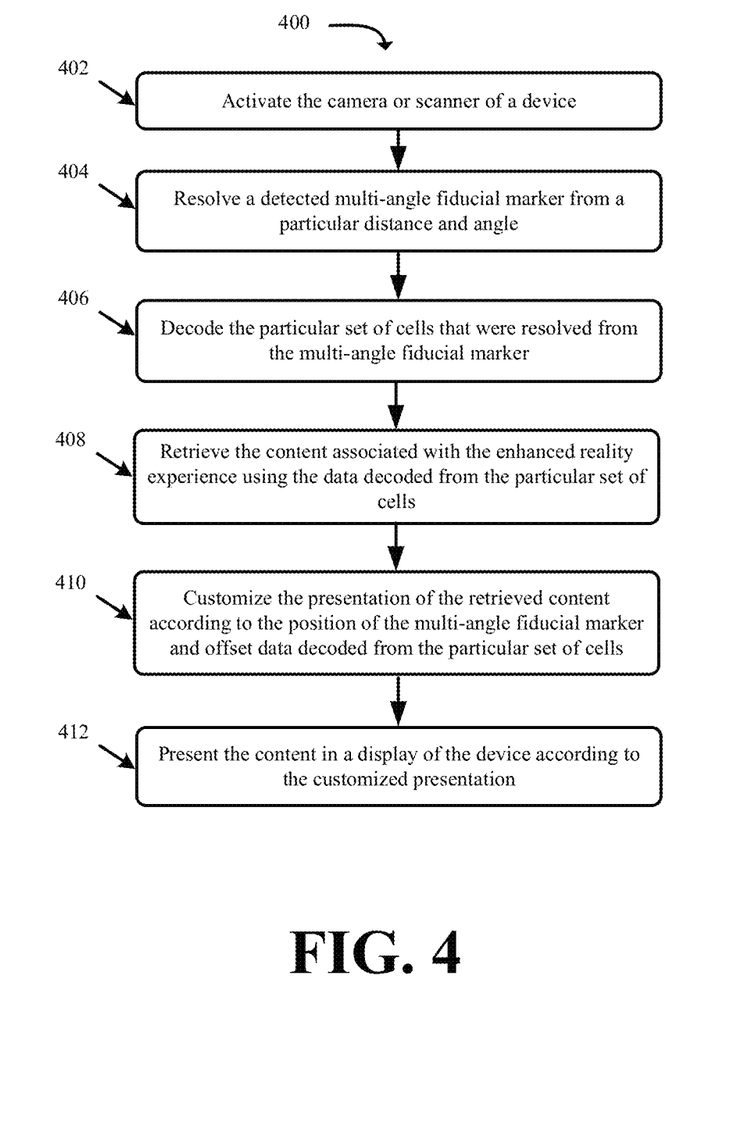
FIG. 4 presents a process for generating different customized enhanced reality experiences from a multi-angle fiducial marker in accordance with some embodiments presented herein.

FIG. 4 presents a process 400 for generating different customized enhanced reality experiences from a multi-angle fiducial marker in accordance with some embodiments presented herein. Process 400 is implemented by device 100. Device 100 includes a camera or scanner, a display, and processing, memory, storage, network, and/or other hardware resources for generating the customized enhanced reality experiences.

Process 400 includes activating (at 402) the camera or scanner of device 100 to scan for multi-angle fiducial markers 101, QR codes, and/or other machine-readable tags. In some embodiments, the user manually activates (at 402) the camera or scanner to place device 100 into a passive scanning mode of operation. In some other embodiments, device 100 automatically activates (at 402) the camera or scanner when powered on or when in normal use (e.g., an augmented reality headset or glasses, an artificial intelligence assistive wearable device, etc.).

Process 400 includes resolving (at 404) a detected multi-angle fiducial marker from a particular distance and angle. Resolving (at 404) the multi-angle fiducial marker includes detecting start and end markers associated with a particular set of cells and/or determining that cells in between the start and end markers are fully readable and not obfuscated. Resolving (at 404) the multi-angle fiducial marker may further include determining that one or more cells associated with other sets of cells cannot be resolved due to obfuscation resulting from an off-angle capture of those cells.

Process 400 includes decoding (at 406) the particular set of cells that were resolved (at 404) from the multi-angle fiducial marker. Decoding (at 406) the particular set of cells may include identifying the start and end markers for the particular set of cells, and converting the shapes or patterns of the particular set of cells between the start and end markers to an alphanumeric string. For instance, the positioning of different shapes or patterns within each cell or along the length of the particular set of cells may encode different alphanumeric characters similar to the positioning and size of blocks within a QR code. In some embodiments, the alphanumeric string corresponds to a URL, hyperlink, or other identifier for accessing content of an enhanced reality experience and/or an offset value that identifies a position of the particular set of cells or an angle at which to present the content relative to the multi-angle fiducial marker or the position of the multi-angle fiducial marker in the user or device field-of-view.

Process 400 includes retrieving (at 408) the content associated with the enhanced reality experience using the data decoded (at 406) from the particular set of cells. Device 100 may issue a HyperText Transfer Protocol (HTTP) GET request or a request message in another format to the content distribution system or server identified at the URL or network address in the decoded alphanumeric string, and may download the content in response to the request.

Process 400 includes customizing (at 410) the presentation of the retrieved (at 408) content according to the position of the scanned multi-angle fiducial marker and offset data that was decoded (at 406) from the particular set of cells. In some embodiments, customizing (at 410) the presentation includes determining an offset position for the content relative to the position of the multi-angle fiducial marker, and adjusting the rotation or orientation of the content according to the offset data. Accordingly, the offset data may specify an amount by which to transform the content, wherein the transformations may include rotating or orientating the content so that the content is made to face or be directed toward device 100.

In some embodiments, the offset data may also specify the offset position for the content relative to the position of the multi-angle fiducial marker. For instance, the offset data may specify how far in front of the multi-angle fiducial marker, how far off the ground, and at what angle relative to the multi-angle fiducial marker the content is to be rendered. In other words, the offset data may specify sizing, positional, and other transformations for the content.

In some other embodiments, the position, distance, and/or size at which to render the content relative to the position of the multi-angle fiducial marker is determined based on the distance between the multi-angle fiducial marker and device 100. For instance, if device 100 is determined to be 20 feet away from the multi-angle fiducial marker, then the retrieved (at 408) content may be rendered 10 feet away from the multi-angle fiducial marker and toward device 100 at a first size. If device 100 is determined to be 5 feet away from the multi-angle fiducial marker, then the retrieved (at 408) content may be rendered 1 foot away from the multi-angle fiducial marker and toward device 100 at a smaller second size so as to reduce the percentage of the display that is taken up by the content. The distance between the multi-angle fiducial marker and device 100 may be determined based on the size at which the multi-angle fiducial marker is captured in an image or may be determined by distance measurements generated by a Light Detection and Ranging (LiDAR) or other sensor of device 100.

Process 400 includes presenting (at 412) the content in a display of device 100 according to the customized (at 410) presentation. Specifically, device 100 presents (at 412) the content at a specific position and with a specific orientation relative to the position and orientation of the multi-angle fiducial marker in the display or field-of-view of the camera or scanner of device 100.

Device 100 may continually scan the multi-angle fiducial marker as device 100 is moved past or around the multi-angle fiducial marker. Device 100 may decode different sets of cells from the multi-angle fiducial marker that become resolvable from the different device 100 position, and may update the enhanced reality experience by presenting different content or different presentation of the previously retrieved content based on the data that is decoded from the different sets of cells. For instance, device 100 may present the retrieved content adjusted to a first angle relative to the multi-angle fiducial marker (e.g., rotate the content by a first amount) in response to decoding the first angle from a first set of cells in the multi-angle fiducial marker that become readable with device 100 at a first position relative to multi-angle fiducial marker 101, and may adjust the position or orientation of the content according to a second angle relative to the multi-angle fiducial marker (e.g., rotate the content by a second amount) in response to decoding the second angle from a second set cells in the multi-angle fiducial marker that become readable with device 100 at a second position relative to the multi-angle fiducial marker.

In some embodiments, device 100 may automatically adjust the positioning, orientation, and/or presentation of the content that is retrieved in response to resolving and/or decoding a single set of cells from a multi-angle fiducial marker. In some such embodiments, device 100 uses onboard sensors to track changes in the position of device 100 relative to the position of that multi-angle fiducial marker after resolving the single set of cells, and device 100 updates the presentation of the content based on the tracked changes.

Figure 5:
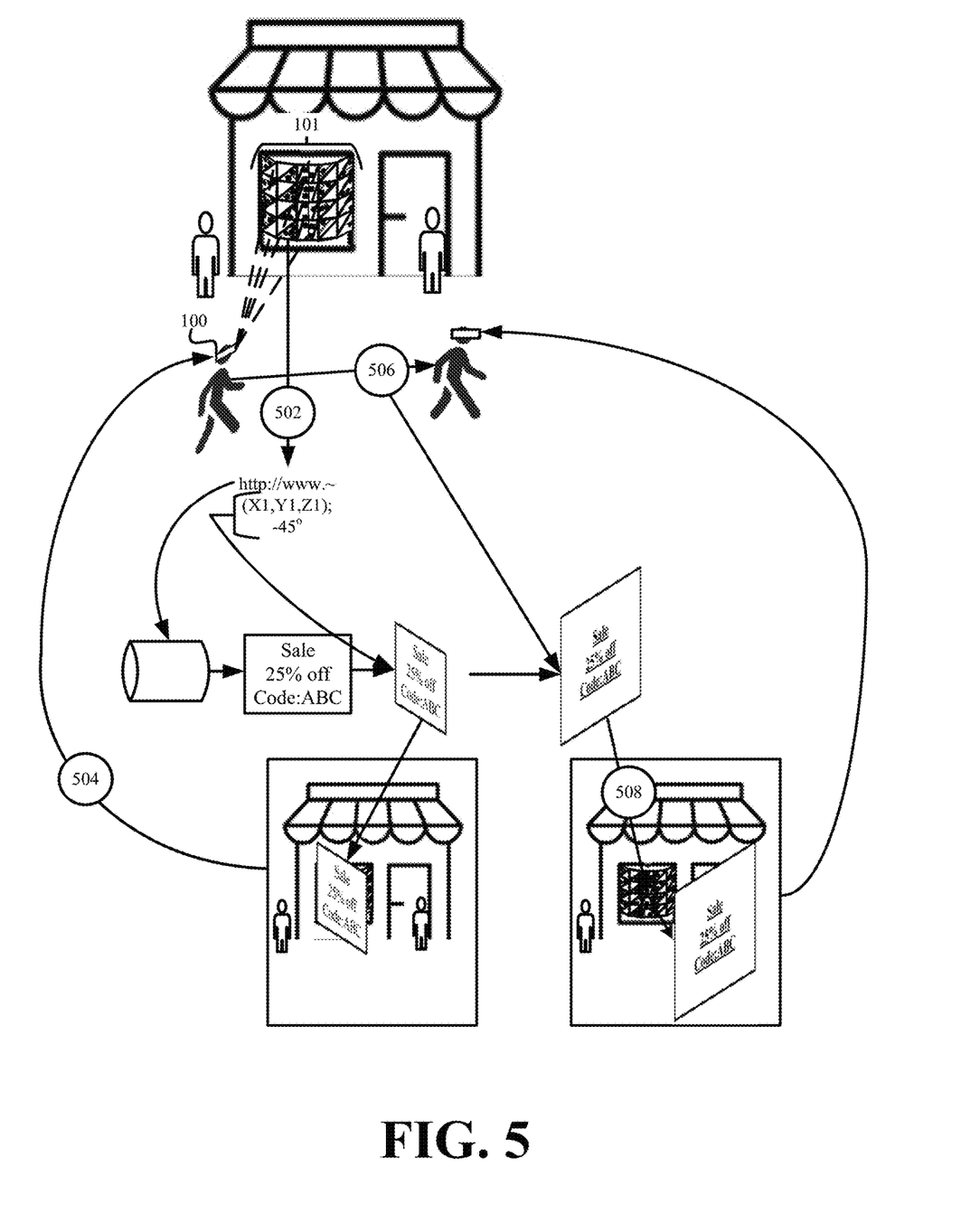
FIG. 5 illustrates an example of customizing the enhanced reality content by tracking the positioning of a multi-angle fiducial marker in accordance with some embodiments presented herein.

FIG. 5 illustrates an example of customizing the enhanced reality content by tracking the positioning of multi-angle fiducial marker 101 in accordance with some embodiments presented herein. Device 100 decodes (at 502) data from a particular set of cells from different sets of neighboring cells of multi-angle fiducial marker 101 in response to the particular set of cells becoming resolvable and/or readable from a current position of device 100. Specifically, multi-angle fiducial marker 101 is captured in a field-of-view of the device's 100 camera at a position and/or angle in which all cells of the particular set of cells are differentiable (e.g., resolve to a recognized shape or pattern) while one or more cells of other sets of neighboring cells are undifferentiable (e.g., resolve to unrecognized shapes or patterns or are captured as solid black or white cells due to angling and/or other optical effects used to display multi-angle fiducial marker 101). The decoded (at 502) includes a link for accessing content associated with a particular enhanced reality experience, and transform data or offset values for positioning the content relative to multi-angle fiducial marker 101 in the user's field-of-view or in the display of device 100.

Device 100 generates (at 504) an initial presentation for the content that is retrieved using the decoded (at 502) link. Device 100 presents the content at a position and orientation relative to multi-angle fiducial marker 101 based on the decoded (at 502) transform data or offset values. For instance, device 100 renders the content at a position relative to a position of multi-angle fiducial marker 101 in the user's field-of-view or the display of device 100 and with an orientation that is defined based on the offset values.

Device 100 tracks (at 506) changes to its position and/or orientation as the user and/or device 100 moves from a position and/or orientation associated with the initial presentation. In some embodiments, device 100 includes an inertial sensor, gyroscope, compass, LiDAR, and/or other sensors for measuring the positional and/or orientation changes.

Device 100 updates (at 508) the content by changing the positioning and/or orientation of the content according to the tracked changes to the position and/or orientation of device 100. In some embodiments, device 100 updates (at 508) the content to retain the presentation of the content at a consistent position relative to multi-angle fiducial marker 101 and at a consistent orientation relative to device 100. For instance, device 100 updates (at 508) the content so that it is rendered at an x, y, and z position that is in front of multi-angle fiducial marker 101 despite the position of multi-angle fiducial marker 101 changing in the field-of-view and further updated (at 508) the content to keep the content oriented towards or in the direction of device 100 despite device 100 moving away or around multi-angle fiducial marker 101.

In some embodiments, device 100 additional customizations may be made to the enhanced reality experience and/or the content that is associated with multi-angle fiducial marker 101 based on supplemental data provided by device 100. In some such embodiments, device 100 may analyze the decoded URL, link, or identifier to identify the content source, and may provide supplemental data that is relevant to the source or that the source may use to customize the content that is returned to device 100. For instance, the supplemental data may include the user name so that the content may be customized to greet the user. The supplemental data may include purchase history or account information that the user has with a particular merchant so that the content may be customized according to the purchase history or account information.

Figure 6:
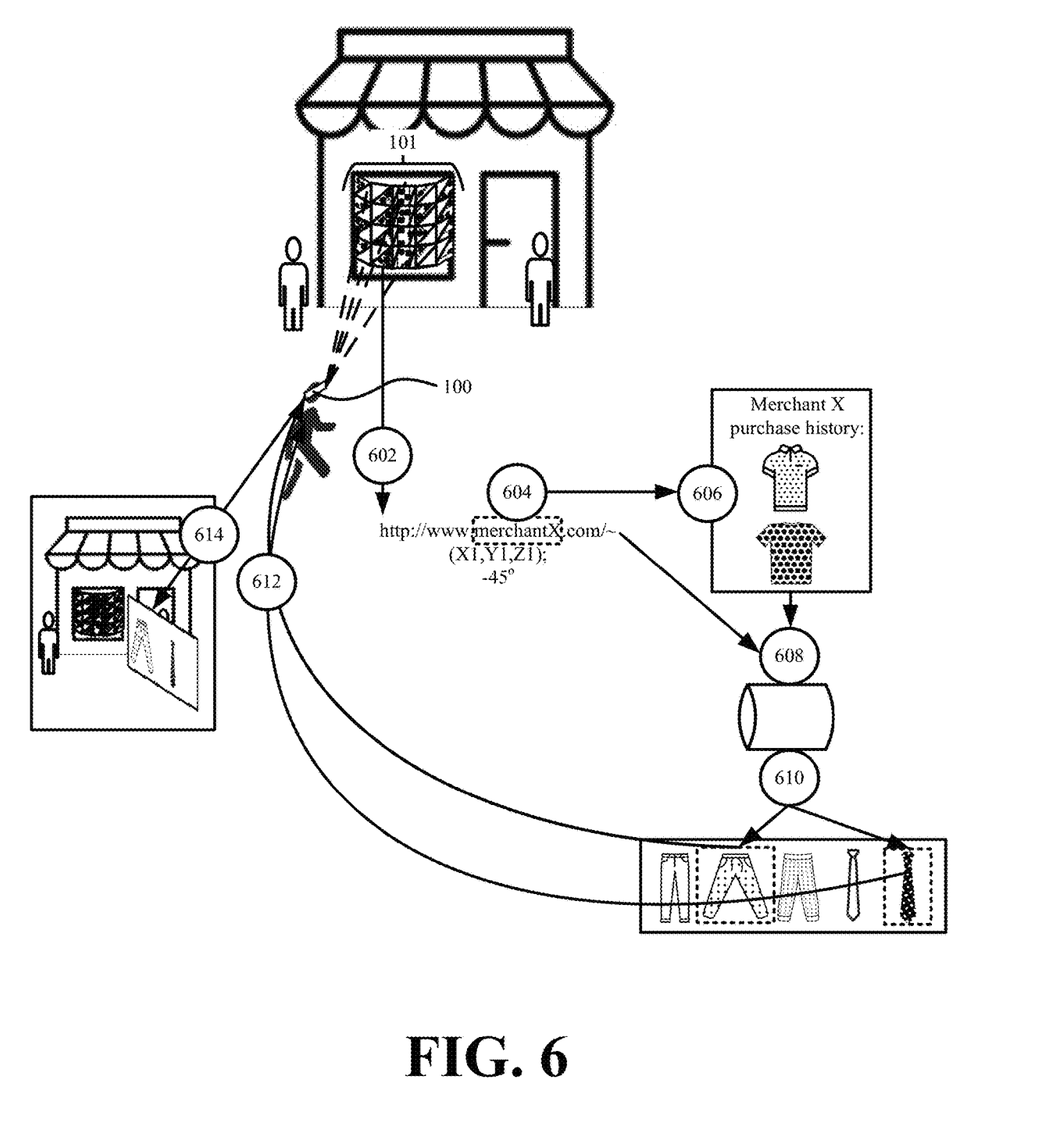
FIG. 6 illustrates an example of customizing the enhanced reality experience based on supplemental data provided by the device presenting the enhanced reality experience in accordance with some embodiments presented herein.

FIG. 6 illustrates an example of customizing the enhanced reality experience based on supplemental data provided by device 100 presenting the enhanced reality experience in accordance with some embodiments presented herein. Device 100 is moves past multi-angle fiducial marker 101, and a camera or scanner of device 100 detects (at 602) and/or reads a particular set of cells from multi-angle fiducial marker 101. In particular, device 100 decodes a URL and/or one or more positional data from the particular set of cells.

Device 100 may analyze (at 604) the URL to determine the content source. For instance, device 100 may determine the content source from the domain name or other source identifier in the URL.

Device 100 selects (at 606) supplemental data that may be relevant to customizing the content that is accessible at the decoded (at 604) URL. For instance, device 100 may determine that the URL is associated with a first content provider (e.g., a first domain name), and may select user account information that is stored for that first content provider. The user account information may include login credentials or a login token that is securely stored on device 100 and that is used to access a user account at the first content provider. Alternatively, the user account information may store preferences, user purchase history, user activity history, and/or other data that is stored based on previous interactions the user or device 100 has with the first content provider. In some embodiments, the supplemental data may include more general information such as a name of the user using device 100 or identifying information about device 100 (e.g., make and model). In some embodiments, the supplemental data may include data that the user has authorized for distribution to the first content provider or to the content distribution system from which different enhanced reality experiences are accessed from scanning different multi-angle fiducial markers 101.

Device 100 issues (at 608) a request for the content identified by the URL with the selected (at 606) supplemental data. The request routes over a data network to a content distribution system or to the content source associated with the URL. The content distribution system retrieves the content identified by the URL and customizes (at 610) the content based on the included supplemental data. For instance, the content may correspond to a digital sales agent or store representative. The supplemental data may be used to customize the greeting that the digital sales agent provides to the user. The customized greeting may include speaking the user's name. Alternatively, customizing (at 610) the content may include prioritizing the presentation of a set of goods that match user preferences or that are related to past user purchases identified in the supplement data.

Device 100 receives (at 612) the customized content from the content distribution system, and presents (at 614) the customized content on a display of device 100 at an offset position from the position of multi-angle fiducial marker 101 in the display. The offset position is determined based on the offset value that is decoded from the particular set of cells and is specified relative to the position of multi-angle fiducial marker 101 in the display of device 100.

Figure 7:
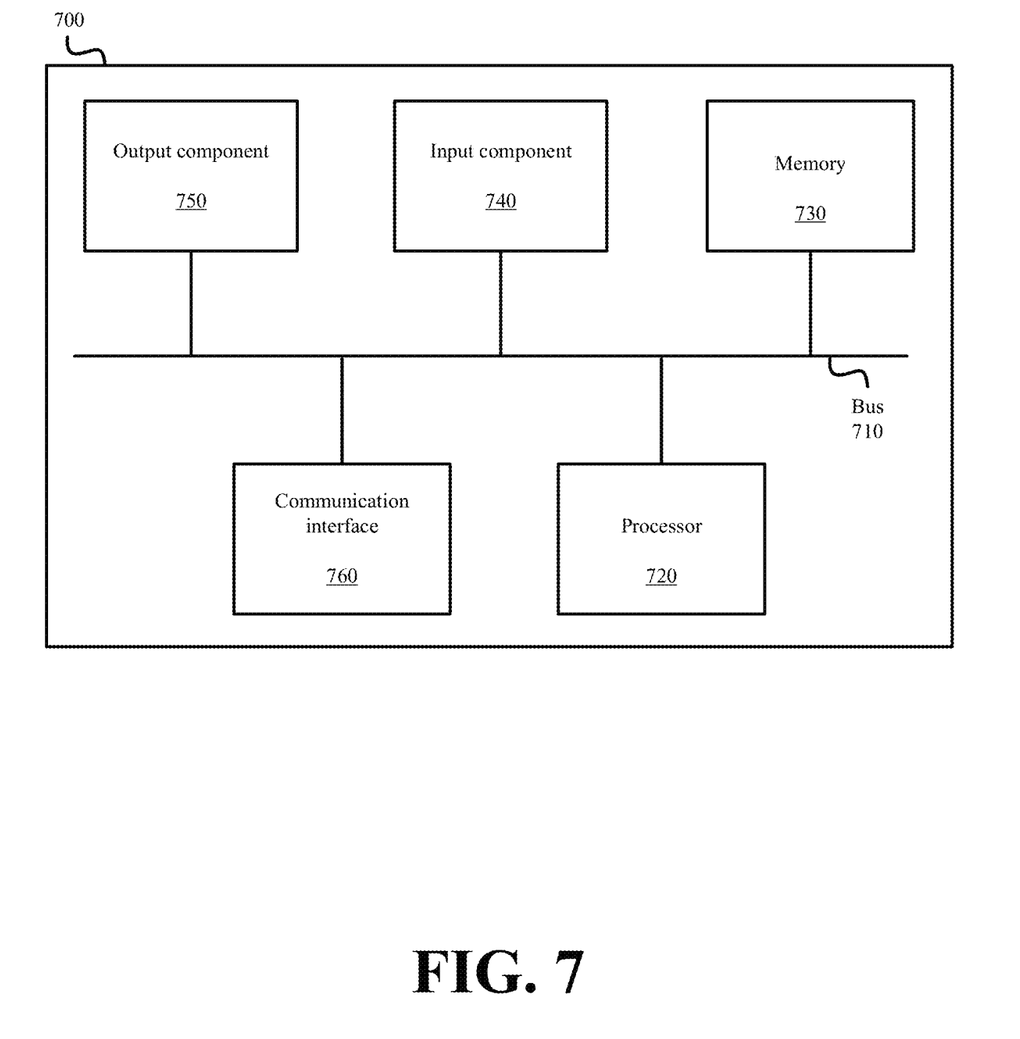
FIG. 7 illustrates example components of one or more devices, according to one or more embodiments described herein.

FIG. 7 is a diagram of example components of device 700. Device 700 may be used to implement one or more of the tools, devices, or systems described above (e.g., device 100, the content distribution system, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
    detecting a multi-angle fiducial marker that is in a field-of-view of a device, the multi-angle fiducial marker comprising different sets of cells with each set of cells encoded with different data;
    decoding first data from a particular set of cells of the different sets of cells in response to the particular set of cells being resolvable from a position of the device relative to a position of the multi-angle fiducial marker and one or more cells from other sets of cells being unresolvable from the position of the device relative to the position of the multi-angle fiducial marker;
    retrieving a content that is defined with a first presentation from a source identified in the first data;
    defining a second presentation for the content based on the first data; and
    generating an enhanced reality experience with the second presentation of the content presented at a specific position relative to the position of the multi-angle fiducial marker in a display of the device.

2. The method of claim 1 further comprising:
    decoding second data from a second set of cells of the different sets of cells in response to the device moving from a first position to a second position relative to the position of the multi-angle fiducial marker at which the second set of cells become resolvable and one or more cells of the particular set of cells become unresolvable.

3. The method of claim 2 further comprising:
    defining a third presentation for the content based on the second data, wherein defining the third presentation comprises one or more of rotating or resizing the second presentation of the content; and
updating the enhanced reality experience with the third presentation of the content in response to the device decoding the second set of cells.

4. The method of claim 2, wherein the content is a first content, the method further comprising:
retrieving a second content that is identified in the second data; and
updating the enhanced reality experience by replacing the first content with a presentation of the second content that is defined based on the second data.

5. The method of claim 1, wherein defining the second presentation:
rotating the content according to an angle at which the device is offset from the multi-angle fiducial marker.

6. The method of claim 1, wherein the first data comprises a link at which to access the content, and transform data that specifies an amount of rotation that orients the content towards the position of the device relative to the position of the multi-angle fiducial marker.

7. The method of claim 1, wherein each set of cells of the different sets of cells encodes a common link for accessing the content and different offset values for orienting the content relative to different positions or angles associated with each set of cells.

8. The method of claim 1, wherein generating the enhanced reality experience comprises:
capturing an image of a scene with the multi-angle fiducial marker; and
overlaying the second presentation of the content onto the image at the specific position relative to the position of the multi-angle fiducial marker in the image.

9. The method of claim 1 further comprising:
tracking changes to the position of the device relative to the position of the multi-angle fiducial marker using one or more sensors of the device; and
updating the enhanced reality experience by adjusting the second presentation of the content according to the changes to the position of the device relative to the position of the multi-angle fiducial marker.

10. The method of claim 1, wherein each set of cells from the different sets of cells is printed on the multi-angle fiducial marker with an offset angle or an optical illusion that causes that set of cells to be resolvable from a distinct set of angles.

11. The method of claim 1, wherein the multi-angle fiducial marker is wrapped around a curved surface with each set of cells from the different sets of cells becoming resolvable when viewed from different angles.

12. The method of claim 1, wherein decoding the first data comprises:
detecting start and end markers associated with the particular set of cells;
determining each cell in the particular set of cells between the start and end markers comprises a recognized shape or pattern; and
extracting one or more values or an alphanumeric string from the recognized shape or pattern in each cell of the particular set of cells.

13. The method of claim 1 further comprising:
determining the source identified in the first data;
selecting supplemental data for customizing the content that is retrieved from source in response to determining the source; and
issuing a request for the content with the supplemental data to the source.

14. A device comprising:
a display;
a camera or scanner; and
one or more hardware processors configured to:
detect a multi-angle fiducial marker that is in a field-of-view of the camera or scanner, the multi-angle fiducial marker comprising different sets of cells with each set of cells encoded with different data;
decode first data from a particular set of cells of the different sets of cells in response to the particular set of cells being resolvable from a position of the device relative to a position of the multi-angle fiducial marker and one or more cells from other sets of cells being unresolvable from the position of the device relative to the position of the multi-angle fiducial marker;
retrieve a content that is defined with a first presentation from a source identified in the first data;
define a second presentation for the content based on the first data; and
generate an enhanced reality experience with the second presentation of the content presented at a specific position relative to the position of the multi-angle fiducial marker in the display.

15. The device of claim 14, wherein the one or more hardware processors are further configured to:
decode second data from a second set of cells of the different sets of cells in response to the device moving from a first position to a second position relative to the position of the multi-angle fiducial marker at which the second set of cells become resolvable and one or more cells of the particular set of cells become unresolvable.

16. The device of claim 15, wherein the one or more hardware processors are further configured to:
define a third presentation for the content based on the second data, wherein defining the third presentation comprises one or more of rotating or resizing the second presentation of the content; and
update the enhanced reality experience with the third presentation of the content in response to the device decoding the second set of cells.

17. The device of claim 15, wherein the content is a first content, and wherein the one or more hardware processors are further configured to:
retrieve a second content that is identified in the second data; and
updating the enhanced reality experience by replacing the first content with a presentation of the second content that is defined based on the second data.

18. The device of claim 14, wherein defining the second presentation:
rotating the content according to an angle at which the device is offset from the multi-angle fiducial marker.

19. The device of claim 14, wherein the first data comprises a link at which to access the content, and transform data that specifies an amount of rotation that orients the content towards the position of the device relative to the position of the multi-angle fiducial marker.

20. A non-transitory computer-readable medium storing instructions that, when executed by one or more processors of a device, cause the device to perform operations comprising:
detecting a multi-angle fiducial marker that is in a field-of-view of the device, the multi-angle fiducial marker comprising different sets of cells with each set of cells encoded with different data;

decoding first data from a particular set of cells of the different sets of cells in response to the particular set of cells being resolvable from a position of the device relative to a position of the multi-angle fiducial marker and one or more cells from other sets of cells being unresolvable from the position of the device relative to the position of the multi-angle fiducial marker;

retrieving a content that is defined with a first presentation from a source identified in the first data;

defining a second presentation for the content based on the first data; and generating an enhanced reality experience with the second presentation of the content presented at a specific position relative to the position of the multi-angle fiducial marker in a display of the device.

\* \* \* \* \*